July 22, 1952  W. W. PRUE  2,604,165
METHOD OF AND APPARATUS FOR CUTTING SHEET MATERIAL
Filed Feb. 16, 1949
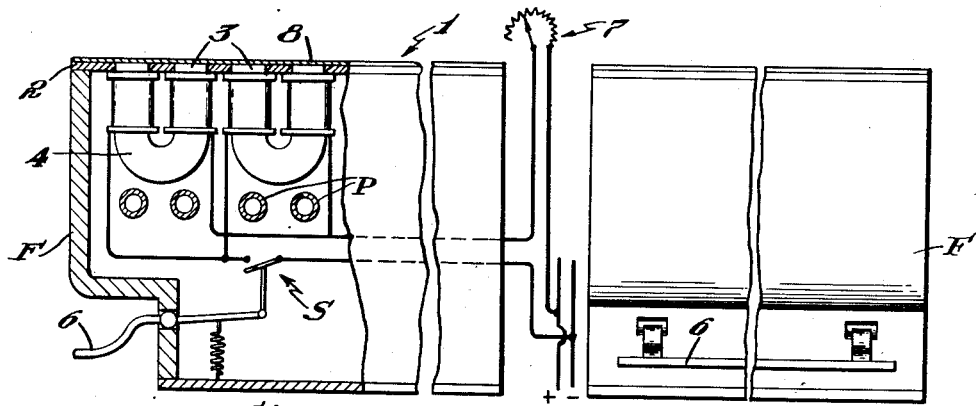
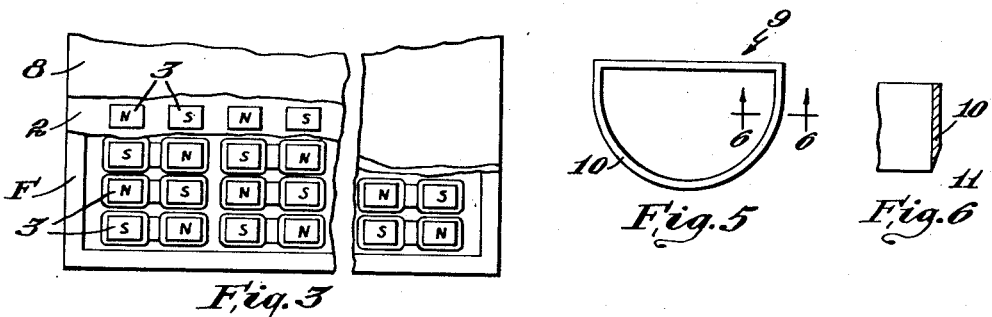
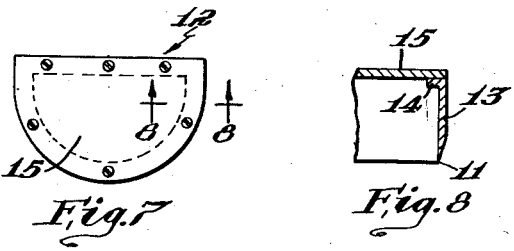
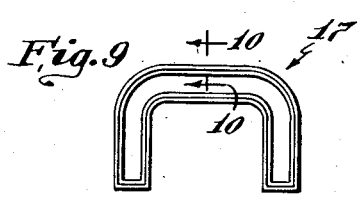
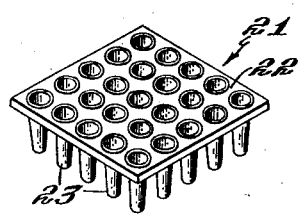
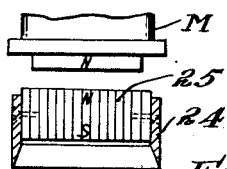
Inventor
Walter W. Prue
by Roberts Cushman & Crown
Att'ys.

Patented July 22, 1952

2,604,165

UNITED STATES PATENT OFFICE 2,604,165

METHOD OF AND APPARATUS FOR CUTTING SHEET MATERIAL

Walter W. Prue, Auburn, Maine

Application February 16, 1949, Serial No. 76,836

17 Claims. (Cl. 164—18)

This invention pertains to the art of cutting sheet material by the use of work-penetrating dies, punches or other cutters which cut by movement substantially perpendicular to the surface of the work (as contrasted with cutters operating by shear action) and relates to a novel method of and means for cutting sheet material by the use of such cutters.

While of general utility, for instance for use in cutting paper, cardboard or the like; for use in cutting textile fabrics such as are employed, for example, in the garment industries; or for use in cutting thin metal foil, mica, sheet plastics, etc., such as are used in the electrical and allied industries, etc., its use is here specifically explained with reference to the cutting of the materials (leather, cloth, rubberized cloth or the like) employed in the manufacture of footwear.

In making footwear, the constituent parts which are afterward assembled to form a shoe are, at the present time, most commonly cut to the proper contours from the selected material by the use of dies which are forced through the material by blows or pressure. While under certain conditions shoe upper material is still sometimes cut by hand, using a knife and a pattern, this older method has been very largely superseded by the use of dies as just above suggested. For this purpose the dies employed for cutting the upper stock are customarily formed from thin steel ribbon bent to the proper contour and sharpened at one or both edges. In using such a die, the work is placed upon a wooden or fibre bed forming the fixed platen of a so-called "clicking" machine, the die is positioned on the work, and the vertically movable arm or platen of the clicking machine is swung over the die and caused to descend and deliver a blow to the die such as to drive the latter down through the work. The machine commonly used for cutting sole leather also has a fixed wooden or fibre bed and has a vertically movable platen sliding in fixed guides at opposite sides of the bed, the platen in this machine always being disposed directly above the bed. In the operation of this latter machine, the worker is obliged to move the work about and to place the die in position while the movable platen stands directly above the working point where it shades the work, and its guides, at opposite sides of the bed, constrict the working space and interfere with freedom of operation. Moreover, the possibility of accidental descent of the vertically movable platen, although possibly remote, is always present.

While the movable platen or head of the clicking machine may be swung laterally away from the working point, thus leaving an unencumbered working space, the swinging of this necessarily massive head is very tiring and its movement from and toward the working position above the die consumes a very substantial fraction of the total working period. As in the dinking machine, there is always present the possibility that the head may be accidentally actuated with possible serious injury to the operator and this is true of any machine, including machines for ornamentally perforating shoe materials, wherein a die or cutter is driven or forced through the work by a mechanically moving platen, ram or hammer. Moreover, all machines employing reciprocating parts for forcing the die through the work produce substantial vibration and noise when in operation and must be provided with very substantial foundations to avoid injury to the structure in which they are used.

The present invention has for its principal object the provision of a novel method of and means for causing a die to penetrate sheet material. A further object is to provide a novel method of and means for actuating a cutting die such that vibration and noise is substantially eliminated; the work is freely and fully exposed for the positioning of the dies; all danger of injury to the operator by the accidental descent of a heavy platen, plunger or ram is eliminated; the speed of operation is increased as compared with prior methods of procedure; and the operator is relieved of the effort of moving a massive platen to and from the working positions. A further object is to provide a novel method of and apparatus for use in impelling a cutting die through sheet material by the use of magnetic action. A further object is to provide apparatus for use in cutting sheet material wherein a bed supports the work to be cut and means below the bed operates, at the will of the user, to establish a magnetic field of sufficient strength to move the die downwardly through the work. A further object is to provide a cutting die especially useful in a machine wherein the movement of the die through the work is occasioned by magnetic attraction. Other and further objects and advantages of the invention will be pointed out in the following more detailed description and by reference to the accompanying drawings wherein:

Fig. 1 is a fragmentary, diagrammatic front to rear vertical section, partly in elevation, illustrating apparatus embodying the present invention;

Fig. 2 is a fragmentary, diagrammatic front elevation of the apparatus shown in Fig. 1;

Fig. 3 is a diagrammatic, fragmentary plan view, with parts removed, of the apparatus of Fig. 1;

Fig. 4 is a fragmentary, vertical section through the cutting bed of the apparatus of the present invention, to larger scale than Fig. 1, illustrating the positioning of a cutting die relatively to work resting upon the bed of the machine;

Fig. 5 is a plan view illustrating a typical cutting die such as may be used in the practice of the present invention;

Fig. 6 is a section, to larger scale, on the line 6—6 of Fig. 5;

Fig. 7 is a plan view of a cutting die of modified construction especially useful in the practice of the present method;

Fig. 8 is a fragmentary section, to larger scale, on the line 8—8 of Fig. 7;

Fig. 9 is a diagrammatic plan view of a preferred form of cutting die for use in the practice of the present invention;

Fig. 10 is a vertical section, to larger scale, on the line 10—10 of Fig. 9;

Fig. 11 is a perspective view illustrating a perforating die useful in accordance with the practice of the present invention; and Fig. 12 is a diagrammatic, vertical section illustrating another form of die.

Referring to the drawings, the numeral 1 designates a cutting bed upon which the work is placed preparatory to the cutting operation. This bed is here shown as horizontal and as comprising an upper slab 2 of a nonmagnetic material, for example, a copper or aluminum alloy in which are embedded the poles 3 of the electromagnets 4, with the axes of the pole pieces parallel and vertical and preferably spaced substantially uniformly in both directions in the horizontal plane. The ends of the pole pieces are flush with the upper surface of the slab 2, and with the latter constitute the work support. As illustrated, by way of example, these magnets are of horseshoe type. These magnets may be conventional commercial magnets of appropriate design for use with the kind of current which is to be used, but should be of modern high efficiency type. The windings of the several magnets are connected in parallel to an electrical supply circuit, the circuit having a normally open switch S which as here diagrammatically illustrated, is controlled by a treadle 6 so that by depression of the treadle the operator may close the circuit and thus energize the magnetic coils. Obviously other modes of closing the switch at will may be used, and switches of any commercial type appropriate to the current used may be employed. Since heat is generated in the operation of the magnets, it is contemplated that, if necessary, cooling means, for example pipes P, through which cold water flows may be arranged beneath the bed 1 and in the near vicinity of the magnets. Other cooling means, for example means for circulating cool air, may be used. While a multitude of magnetic poles is here illustrated, the cutting bed being of extended area, the number of poles will vary with the size of bed and with the size of the individual pole pieces, and it is contemplated that for certain work, a single pole piece might be sufficient.

The cutting bed is supported by a suitable frame F of the proper dimensions and of a height and of sufficient strength to support the weight of the magnets, and the magnets are fixed and supported within the frame by any suitable form of shelf, bracket, girder or grill, not here shown. Preferably this frame and the magnet-supporting means should be of nonmagnetic material, for instance wood or aluminum. In order to vary the intensity of the magnetic force in accordance with the thickness or character of the material being cut, current-varying means, appropriate to the kind of current (direct or alternating), may be provided. Merely by way of illustration, a rheostat 7 is here shown as the current-varying means. The rheostat or other appropriate current-varying means may be provided with a scale and graduations indicating the intensity of current or, alternatively, to show the proper setting of the current-varying means to correspond to different thicknesses or kinds of material.

In order to provide a cutting surface which will not dull the dies too rapidly, it is suggested that a very thin layer 8 (Fig. 1) of nonmagnetic material, for example, paper, or sheet copper or aluminum, may cover the pole pieces 3 of the magnets and the slab 2. However, this layer 8 should be very thin in order to avoid increasing the gap between the magnetic poles and the die and this layer 8 may be dispensed with, if preferred.

The pole pieces 3 of the magnets, as above noted, are embedded in the slab 2 of the nonmagnetic material and should be spaced apart a distance at least as great and preferably somewhat greater than the maximum thickness of the material to be cut. As illustrated, the pole pieces are arranged with north and south poles in alternation throughout the area of the bed. In Figs. 5 and 6 a conventional die 9 is illustrated of the type commonly used in shoe manufacture for cutting upper leather. This die consists of a ribbon-like strip 10 of tool steel bent to the proper contour and having its ends brazed or otherwise united and as illustrated, by way of example, has one edge sharpened to provide the cutting edge 11. Dies having both edges sharp may obviously be used. In order to provide a more extended area of ferrous material for the action of the magnetic force, it may be desirable, as shown in Figs. 7 and 8, to use a die like the die 12, wherein the blade 13 has the horizontal top flange 14 to which is secured a cover plate 15 of soft iron or the like. Instead of attaching the cover plate to the die, a separate plate of ferrous metal may be provided, and the operator may place it on top of the die to increase the effective magnetic area whenever it seems desirable.

Another and preferred form of die is shown in Figs. 9 and 10. The die 17, illustrated by way of example, is properly contoured to cut a desired piece from the sheet material and is of cruciform shape in section (Fig. 10), comprising a thick central portion or rib 18 of substantial transverse width, thus providing a mass of ferrous material for magnetic attraction and having cutting blades 19 and 20 projecting from its upper and lower surfaces. The part 18 serves as a convenient handle for manipulating the die and the provision of oppositely directed blades makes it possible to use the die for a longer period before sending it to the sharpener. It will be understood that the invention is not concerned with the particular horizontal contour of the die, which will be shaped in accordance with customary die-making practice to provide a cutting edge shaped to cut any desired pattern.

In Fig. 11 another form of die is illustrated.

this die 21 comprising the plate 22, preferably of soft iron and having a series of hollow dies or punches 23 fixed to it. Such a die may be used, for example, in providing ornamental or ventilating perforations in the material of a shoe.

In Fig. 12 there is shown a die comprising a cutting blade 24 having mounted therein a permanent magnet 25, shown, for example, with its north pole uppermost. When using such a die, the electromagnets would be bar-magnets with their north poles up (to correspond to the die illustrated).

An alternative possibility, when using such a die, would be to support the electromagnets M in a horizontally movable carrier above the die, with the north poles of the magnets down (to correspond to the die shown) and in such an arrangement, the die would be impelled through the work by magnetic repulsion.

The operation of the apparatus will be obvious. The user places the material T (Fig. 4) which is to be cut on the upper surface of the work-supporting bed 1 and then arranges the selected die at the desired place on the material and then depresses the treadle 6. The magnets are instantly energized, exerting a substantially uniform magnetic attraction over the entire area of the bed. Thus, no matter where the die may be placed, it is powerfully attracted toward the bed and its cutting edge is impelled through the work. The operator immediately releases his foot from the treadle, whereupon the magnetic force disappears and he is free to move the die to another position. These operations may be repeated as often as desired and since the entire work-supporting bed is free from obstruction and in view at all times, the operator may move the work and die about in full view and without interference from other parts. Furthermore, he is not required to move a heavy platen back and forth across the bed, nor is he in any danger at any time from the possibility of accidental descent of a heavy platen while he is placing the work and die in position.

While certain desirable arrangements have herein been illustrated diagrammatically and solely by way of example, it is to be understood that the invention is broadly inclusive of any and all modifications and of all equivalent apparatus and means whereby magnetic force, either of attraction or repulsion or both, is employed for impelling a freely movable die through sheet material supported by a cutting bed.

I claim:

1. That method of cutting sheet material which comprises providing a free, manually positionable cutter of ferrous material, the cutter having a sharp edge, placing the material to be cut against a cutting bed, manually positioning the cutter with its edge against the material, and generating a magnetic field whose lines of force permeate the cutter and are of such intensity and so directed as to advance the cutting edge of the cutter through the work.

2. That method of cutting sheet material by the use of a die which comprises providing a die having a cutting edge, the die comprising a portion, at least, which is of ferrous material, disposing the work to be cut upon a cutting bed, placing the die with its edge in contact with the work, and generating a magnetic field below the bed whose lines of force permeate the die and exert upon the die itself a downward force sufficient to pull the die down through the work.

3. That method of cutting sheet material by the use of a free, manually positionable die which comprises providing a die having a cutting edge, the die being of steel and hollow and having a cover plate of ferrous material, manually placing the cutting edge of the die upon the work, and creating a magnetic field of such intensity about said cover plate as to impel the die through the work.

4. That method of cutting shoe material by the use of a free, manually positionable die comprising a body of ferrous metal and a cutting edge, said method comprising placing the die upon the work by hand and impelling the die through the work solely by magnetic force exerted directly upon the die itself.

5. Apparatus for cutting sheet material comprising in combination a manually positionable cutting implement comprising a body of ferrous metal and a sharp cutting edge, and electromagnetic means operative to create a magnetic field whose lines of force permeate said body of ferrous metal and are so directed and of such intensity as to move the cutting edge through work against which said edge is placed.

6. Apparatus for use in cutting sheet material comprising a cutting bed for supporting the work, a loose, manually positionable cutting die comprising a body of ferrous metal and a cutting edge, and electromagnetic means operative to create a magnetic field whose lines of force permeate said body of ferrous metal and which are so directed and of such intensity as to move the cutting edge of the die through work resting upon the bed.

7. Apparatus for use in cutting sheet material comprising a cutting bed for supporting the work, a freely movable cutting die comprising a blade of ferrous metal having a cutting edge, electromagnetic means arranged beneath the bed operative to create a magnetic field whose lines of force permeate a die resting upon work supported by the bed and which are so directed and of such intensity as to pull the cutting edge of the die through the work.

8. Apparatus for use in cutting sheet material comprising a cutting bed for supporting the work, a free, manually positionable cutting die comprising a body of ferrous metal and a cutting edge, electromagnetic means operative to create a magnetic field whose lines of force permeate a die resting upon work supported by the bed and which are so directed and of such intensity as to move the cutting edge of the die through work resting upon the bed, and a switch for closing and opening the circuit which supplies current to the electromagnetic means.

9. Apparatus for use in cutting sheet material and having in combination a cutting bed, electromagnetic means for creating a magnetic field whose lines of force extend above the bed so as to permeate a body of ferrous metal located directly above the bed, and a die designed to be impelled through work resting upon the bed by the direct action of said magnetic field, said die comprising a substantially vertical blade portion having a cutting edge and a portion of greater transverse width than the blade, said wider portion being of ferrous metal and operative to afford an extended area transverse to the lines of magnetic force.

10. Apparatus for use in cutting sheet material and having in combination a cutting bed, electromagnetic means for creating a magnetic field whose lines of force extend upwardly above the bed so as to permeate a body of ferrous metal located directly above the bed, and a manually movable die designed to be impelled through work resting upon the bed by the direct action of said magnetic field, said die comprising a substantially vertical blade portion having a cutting edge, and a handle portion of substantially greater transverse width than the blade, said handle portion being of ferrous metal and affording an extended area in a plane perpendicular to that of the blade and transverse to the lines of magnetic force.

11. Apparatus for use in cutting sheet material and having in combination a cutting bed, electromagnetic means for creating a magnetic field whose lines of force extend upwardly above the cutting bed so as to permeate a body of ferrous metal located immediately above the bed, and a manually movable die designed to be impelled through work resting upon the bed by the direct action of said magnetic field, said die having a substantially vertical blade portion having a cutting edge, the die comprising a permanent magnet having its axis of polarity vertical.

12. Apparatus for use in cutting sheet material and having in combination a cutting bed, electromagnetic means for creating a magnetic field whose lines of force extend upwardly above the bed so as to permeate a body of ferrous metal located immediately above the bed, and a freely movable die designed to be impelled through work resting upon the bed by the direct action of said magnetic field, said die comprising a substantially vertical blade portion having a cutting edge, said blade being hollow and having a cutting edge contoured to cut a piece of desired shape from sheet material resting upon the bed, and a cover plate of ferrous metal superposed upon the die and affording an extended area transverse to the lines of magnetic force.

13. Apparatus for use in cutting sheet material comprising a cutting bed for supporting the work, a freely movable, cutting die comprising a blade of ferrous metal having a cutting edge, a plurality of electromagnets arranged beneath the bed and so disposed that when energized they create a magnetic field adjacent to the bed whose lines of force extend above the bed so as to permeate the ferrous metal of the die when the latter rests on work supported by a bed and which are so directed and of such intensity as to pull the cutting edge of the die through work resting on the bed, conduits for supplying current to the electromagnets, and a switch for closing and opening the circuit which supplies current to the magnets.

14. Apparatus for use in cutting sheet material comprising a cutting bed for supporting the work, a cutting die comprising a blade of ferrous metal having a cutting edge, a plurality of electromagnets arranged beneath the bed with the axes of their pole pieces perpendicular to the bed, said electromagnets being so constructed and arranged that when energized they create a magnetic field whose lines of force extend above the bed and are so directed and of such intensity as to impel the cutting edge of the die through work resting on the bed, a switch for closing and opening the circuit which supplies current to the magnets, and a treadle for actuating the switch.

15. Apparatus for use in cutting sheet material comprising a cutting bed for supporting the work, a cutting die comprising a blade of ferrous metal having a cutting edge, a plurality of electromagnets arranged beneath the bed with the axes of their pole pieces perpendicular to the bed, said electromagnets being so constructed and arranged that when energized they create a magnetic field whose lines of force extend above the bed and which are so directed and of such intensity as to impel the cutting edge of the die through work resting on the bed, a switch for closing and opening the circuit which supplies current to the magnets, a treadle for actuating the switch, and means for varying the intensity of the magnetic field.

16. Apparatus for use in cutting sheet material by the use of a sharp-edged die freely movable by hand, said apparatus comprising in combination a hollow freely movable die having a blade of ferrous metal provided with a cutting edge of desired contour and a transversely extending portion of greater width than the blade, means providing a support for the work to be cut, said support being in part constituted by the end surfaces of the pole pieces of a multitude of electromagnets, said electromagnets being so constructed and arranged as collectively to create a magnetic field of sufficient intensity to draw the cutting edge of the die downwardly through work resting on the support, and means for supplying energizing current to the windings of the magnets.

17. Apparatus for use in cutting upper stock for shoe parts by means of a manually positionable, sharp-edged die, said apparatus comprising in combination a freely movable, hollow die which at any transverse section is of cruciform contour having a thick transverse portion and upwardly and downwardly directed sharp-edged blade portions of ferrous metal, supporting means for the work to be cut including the end surfaces of the pole pieces of a multitude of electromagnets arranged with the axes of their pole pieces parallel and spaced substantially uniformly apart in the horizontal plane, said electromagnets being so constructed and arranged as when energized to create a magnetic field of sufficient intensity to draw the cutting edge of the die downwardly through work resting on the support, and means for supplying current for energizing the windings of the several magnets.

WALTER W. PRUE.

REFERENCES CITED

The following references are of record in the file of this patent:

UNITED STATES PATENTS

| Number | Name | Date |
|---|---|---|
| 869,858 | Leidigh | Oct. 29, 1907 |
| 915,438 | Hornor | Mar. 16, 1909 |
| 949,351 | Clayton | Feb. 15, 1910 |
| 1,152,522 | Leidigh | Sept. 7, 1915 |
| 1,553,529 | Hayden | Sept. 15, 1925 |
| 1,554,236 | Simmons | Sept. 22, 1925 |
| 1,853,471 | Storch | Apr. 12, 1932 |
| 2,171,667 | Mickelson et al. | Sept 5, 1939 |
| 2,193,962 | Carter | Mar. 12, 1940 |
| 2,421,716 | Rose | June 3, 1947 |